United States Patent
DeLuca et al.

(10) Patent No.: US 10,460,371 B2
(45) Date of Patent: *Oct. 29, 2019

(54) DURABLE MEMENTO METHOD

(71) Applicant: DURAGIFT LLC, Windham, NH (US)

(72) Inventors: Mark DeLuca, Windham, NH (US); Spencer Webb, Windham, NH (US)

(73) Assignee: DURAGIFT, LLC, Windham, NH (US)

( * ) Notice: Subject to any disclaimer, the term of this patent is extended or adjusted under 35 U.S.C. 154(b) by 358 days.

This patent is subject to a terminal disclaimer.

(21) Appl. No.: 15/451,359

(22) Filed: Mar. 6, 2017

(65) Prior Publication Data

US 2017/0178211 A1 Jun. 22, 2017

Related U.S. Application Data

(63) Continuation-in-part of application No. 13/831,471, filed on Mar. 14, 2013, now Pat. No. 9,589,062.

(51) Int. Cl.
*G06K 19/06* (2006.01)
*G06K 9/00* (2006.01)
(Continued)

(52) U.S. Cl.
CPC ..... *G06Q 30/0621* (2013.01); *G06K 9/00664* (2013.01); *G06K 9/00671* (2013.01);
(Continued)

(58) Field of Classification Search
CPC .. G06F 16/955; G06F 16/285; G06F 16/9554; G06Q 30/02; G06Q 30/0621;
(Continued)

(56) References Cited

U.S. PATENT DOCUMENTS

| 6,386,457 B1 | 5/2002 | Sorie |
| 6,594,644 B1 | 7/2003 | Van Dusen |

(Continued)

FOREIGN PATENT DOCUMENTS

| EP | 1215610 | 1/2003 |
| KR | 20140064583 A | * 5/2014 |

(Continued)

OTHER PUBLICATIONS

Buchholz "Keepsakes that Talk," KreativeScraps and Photography, Dec. 6, 2012, 6 pages.

(Continued)

*Primary Examiner* — Daniel Samwel
(74) *Attorney, Agent, or Firm* — ARC IP Law, PC; Joseph J. Mayo (57) ABSTRACT

Durable memento method that enables the storage of data associated with mementos, which are objects that serve to provide a reminder of a person, place, thing, or an event. Embodiments are configured to store and recall data including but not limited to pictures, movies, sounds, text, or other information such as performance data indirectly associated with a memento such as but not limited to a keepsake, souvenir, gift, gift card, medal or award, tool or any combination thereof. One or more embodiments may include a visual and/or machine-readable and/or human-readable code to associate the data with the memento. The durable data may be stored remote from the memento, which prevents obsolescence by securing data robustly. This enables the data to be accessed years later even if the file formats or display technology for the data has changed by that time and even if the original memento has been lost.

15 Claims, 7 Drawing Sheets

(51) Int. Cl.
  *G06K 9/62* (2006.01)
  *G06F 16/955* (2019.01)
  *G06Q 30/06* (2012.01)

(52) U.S. Cl.
  CPC ..... *G06K 9/6202* (2013.01); *G06K 19/06028* (2013.01); *G06K 19/06037* (2013.01)

(58) Field of Classification Search
  CPC .......... G06K 9/00664; G06K 9/00671; G06K 9/6202; G06K 19/06028; G06K 19/06037
  See application file for complete search history.

(56) References Cited

U.S. PATENT DOCUMENTS

| | | | |
|---|---|---|---|
| 6,666,378 | B2 | 12/2003 | Davila et al. |
| 7,055,740 | B1 | 6/2006 | Schultz et al. |
| 7,130,817 | B2 | 10/2006 | Karas et al. |
| 7,264,155 | B2 | 9/2007 | Halbur et al. |
| 7,934,661 | B2 | 5/2011 | Nichols |
| 7,959,065 | B2 | 6/2011 | Rosenblatt et al. |
| 8,086,494 | B2 | 12/2011 | Dooley et al. |
| 8,190,519 | B1 | 5/2012 | Angilivelil et al. |
| 8,272,562 | B2 | 9/2012 | Ziegler |
| 8,280,825 | B2 | 10/2012 | Friedman |
| 8,292,166 | B2 | 10/2012 | Gomez et al. |
| 8,651,370 | B1 * | 2/2014 | Mudrick ............ G06Q 30/0239 235/375 |
| 9,158,944 | B2 | 10/2015 | Divringi et al. |
| 9,519,809 | B2 | 12/2016 | Divringi et al. |
| 2001/0053980 | A1 | 12/2001 | Suliman et al. |
| 2002/0156737 | A1 | 10/2002 | Kahn et al. |
| 2003/0004997 | A1 | 1/2003 | Parker et al. |
| 2003/0130907 | A1 | 7/2003 | Karas et al. |
| 2005/0038712 | A1 | 2/2005 | Veeneman |
| 2005/0091120 | A1 | 4/2005 | Auletta |
| 2006/0157554 | A1 | 7/2006 | Halbur et al. |
| 2007/0016864 | A1 | 1/2007 | Kummerli et al. |
| 2007/0146758 | A1 | 6/2007 | Lee |
| 2007/0261071 | A1 | 11/2007 | Lunt et al. |
| 2008/0267504 | A1 | 10/2008 | Schloter et al. |
| 2008/0281692 | A1 | 11/2008 | Zhang et al. |
| 2009/0144104 | A1 | 6/2009 | Johnson |
| 2009/0258710 | A1 | 10/2009 | Quatrochi et al. |
| 2009/0292764 | A1 | 11/2009 | Kamen et al. |
| 2010/0017278 | A1 | 1/2010 | Wilen et al. |
| 2010/0084469 | A1 | 4/2010 | Kuyper-Hammond et al. |
| 2011/0040649 | A1 * | 2/2011 | Dooley ................ G06Q 20/382 705/26.5 |
| 2011/0153462 | A1 | 6/2011 | Granich |
| 2011/0283172 | A1 | 11/2011 | Berger et al. |
| 2012/0054589 | A1 | 3/2012 | Berger et al. |
| 2012/0067943 | A1 | 3/2012 | Saunders et al. |
| 2012/0085828 | A1 | 4/2012 | Ziegler |
| 2012/0209748 | A1 | 8/2012 | Small |
| 2012/0239513 | A1 | 9/2012 | Oliver et al. |
| 2012/0260190 | A1 | 10/2012 | Berger et al. |
| 2012/0265758 | A1 | 10/2012 | Han et al. |
| 2012/0271667 | A1 | 10/2012 | Serling |
| 2012/0271732 | A1 | 10/2012 | Glass et al. |
| 2012/0300087 | A1 | 11/2012 | Shore et al. |
| 2013/0043302 | A1 | 2/2013 | Powlen et al. |
| 2013/0073403 | A1 | 3/2013 | Tuchman et al. |
| 2013/0110808 | A1 | 5/2013 | Naftolin et al. |
| 2013/0173713 | A1 * | 7/2013 | Anderson ............. G06Q 10/10 709/205 |
| 2013/0346337 | A1 | 12/2013 | O'Donnell et al. |
| 2014/0014714 | A1 | 1/2014 | Tang |
| 2014/0058955 | A1 | 2/2014 | Calman |
| 2014/0117076 | A1 | 5/2014 | Eberlein |
| 2014/0181941 | A1 | 6/2014 | Quint |
| 2017/0053035 | A1 | 2/2017 | Divringi et al. |

FOREIGN PATENT DOCUMENTS

| | | |
|---|---|---|
| WO | 2009005487 | 1/2009 |
| WO | 2012111926 | 8/2012 |

OTHER PUBLICATIONS

Qr Code Gifts, retrieved from www.Zazzle.com, Mar. 25, 2013, 5 pages.

* cited by examiner

DURABLE MEMENTO METHOD

This application is a continuation-in-part of U.S. Utility patent application Ser. No. 13/831,471 filed 14 Mar. 2013, issued as U.S. Pat. No. 9,589,062, the specification of which is hereby incorporated herein by reference.

BACKGROUND OF THE INVENTION

Field of the Invention

One or more embodiments of the invention are related to the field of data processing systems and durable storage of data associated with mementos, which are objects that serve to provide a reminder of a person, place, thing, or an event. More particularly, but not by way of limitation, one or more embodiments of the invention enable a durable memento method configured to store and recall data including but not limited to pictures, movies, sounds, text, or other information such as performance data associated with a memento including but not limited to a keepsake, souvenir, gift, gift card, medal or award, tool or any combination thereof.

Description of the Related Art

Current solutions do not enable a user to associate multimedia with a gift in a durable manner. For example, users may take pictures at an event and even post the pictures on a website such as a social media or picture sharing website. However, there is no current way in which to find out what event or multimedia exists for a particular gift or other object.

In addition, if the images are not uploaded to a website, but stored on a local device or even in hardcopy format, they can be lost if the local device is lost or if the hardcopy format is lost, stolen or is destroyed by fire or flooding for example.

In short, there is no known manner in which to store or retrieve multimedia associated with a memento such as a keepsake or souvenir, which limits the ability to recall the person, place, thing or event associated with the memento.

There is no known solution to scan a code associated with a gift and remember who gave the gift or at what event the gift was given for example or for what purpose. Currently, a gift is a gift with only the utility provided by the gift itself without any consideration for any of the data surrounding the gift.

Gift cards are a $100 Billion industry and ever growing. Gift cards are given, used and generally thrown away without any way of storing any multimedia or other event related data for example for later retrieval. Currently, only data such as financial data, or the amount of the value of the card are linked to external data for example at a bank or other financial institution or card issuing entity. The data may be viewable through a website, or through virtual reality locally by scanning information on the card, but that data is directly associated with the card and not associated with the person who gave the card as a gift, place where the gift was given, thing or things associated with the card, such as the weather, maps, or other metadata associated with the gift including but not limited to hyperlinks, or event at which the gift card was given.

For at least the limitations described above there is a need for a durable memento method.

BRIEF SUMMARY OF THE INVENTION

One or more embodiments described in the specification are related to a durable memento method that enables the storage of data associated with mementos, which are objects that serve to provide a reminder of a person, place, thing, or an event. Embodiments are configured to store and recall data including but not limited to pictures, movies, sounds, text, or other information such as performance data associated with a memento including but not limited to a keepsake, souvenir, gift, gift card, medal or award, tool or any combination thereof. In one or more embodiments, the data is not directly associated with the memento itself per se, although the memento may include this data, which is known herein as "other data", e.g., gift card value or serial number or account number or financial information related to an account number, or information not related to the person, place, thing or event directly. The data however, may include pictures, movies, sounds, text, or other information such as performance data associated with a memento that is indirectly associated with the card. This may include data associated with the person who gave the memento, place where the memento was given, thing or things associated with the memento, such as the weather, maps, or other metadata associated with the memento including but not limited to hyperlinks, or event at which the memento was given. Durable association of this type of data with a memento is unknown in the art. One or more embodiments may include a visual and/or machine-readable and/or human-readable code to associate the data with the memento. The durable data may be stored remote from the memento, which prevents obsolescence by securing data robustly and in one or more formats that may be altered at a later time. This enables the data to be accessed years later even if the file formats or display technology for the data has changed by that time and even if the original memento has been lost.

Embodiments of the durable memento system include a memento that includes a physical object, generally having utility, in addition to providing a code associated with the memento. In addition, embodiments of the invention include data storage that is configured to store and retrieve the code and also configured to store and retrieve data associated with the memento. The data storage is coupled to a computer, for example a server and a communications network, for example the Internet to enable remote access from any location.

Embodiments of the system may include any type of memento, for example a keepsake, souvenir, gift, gift card, medal or award, tool or any combination thereof. Examples further include but are not limited to items such as a special event coin, challenge coin, employee award, marketing giveaway, tournament award, medal, trophy, golf divot tool and pet tags.

In one or more embodiments, the code is a visual code that is human-readable or machine-readable. Alternatively or in combination, the code may include a non-visual code that is audible or machine-readable. An example of a visual code that is human-readable is an alphanumeric code. One or more embodiments may utilize a code that is a machine-readable bar code that includes a series of parallel lines that travel in one direction, or a machine-readable two-dimensional bar code. Robust and long lasting embodiments may utilize a code that is engraved onto the memento. Other embodiments of the code include a machine-readable radio frequency identification code. Embodiments of the invention may tag a memento after the memento is constructed, for example with an attachable code, or permanent code or any other type of code that may be associated with the memento for example.

One or more embodiments of the data include pictures, movies, sounds, text or performance data associated with the memento. These types of data are not intended to be limiting and may include data in any known format. If the data is stored in one format that becomes obsolete, the system is configured to translate the format into a more current format. Thus, data in out of date file formats, such as older movie file formats, or even on out of date physical formats, such as floppy disks, that are virtually unreadable at this time, may still be accessed using one or more embodiments of the system. For example, at least one embodiment of the system is configured to convert the data from a stored format to a retrieved format via the computer and transmitted over the communications network on retrieval.

In one or more embodiments, the data may further include advertisements, hyperlinks to gifts or prizes or any combination thereof. This enables the memento to be augmented not only with event or other multimedia data associated with the memento, but also with additional information that may provide a source of revenue for businesses.

Embodiments of the system may obtain the code in a variety of ways. For example, the code may be obtained via the computer after the computer presents an interface having a code entry user interface element. In one or more embodiments, the code may be obtained by the computer from a mobile computer after the mobile computer presents an interface having a code entry user interface element. The code may also be obtained by the computer from a mobile computer after the mobile computer obtains the code visually from the memento through use of a camera coupled with the mobile computer and the computer obtains the code from the mobile computer. Alternatively, or in combination, the code may be obtained by the computer from a mobile computer after the mobile computer obtains the code electronically from the memento through use of a scanner coupled with the mobile computer.

When the data is retrieved at any time after being stored, regardless of the format that the data was stored in, the computer displays the data that includes pictures, movies, sounds, text, or performance data associated with the memento, or hyperlinks thereto, for example on a webpage.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

A durable memento method will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
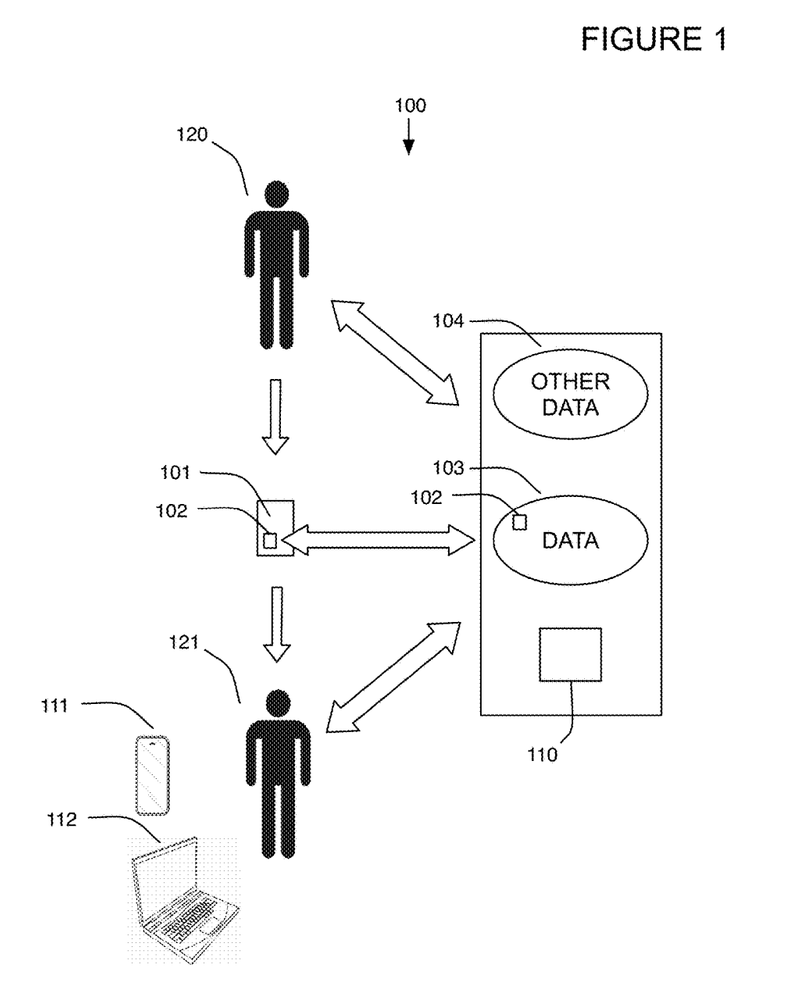
FIG. 1 illustrates an architectural view of at least one embodiment of the durable memento system.

FIG. 1 illustrates an architectural view of at least one embodiment of the durable memento system 100 that enables the storage of data 103 associated with a memento 101, which is an object that serves to provide a reminder of a person, place, thing, or an event. Embodiments of system 100 are configured to store and recall data 103 including but not limited to pictures, movies, sounds, text, or other information such as performance data or any other data that is indirectly associated with memento 101. The memento may include any object such as but not limited to, a keepsake, souvenir, gift, gift card, medal or award, tool or any combination thereof. Although the memento may be associated with "other data" that may include a value of the card, e.g., directly related to the value of the card or an account associated therewith, the data itself is indirectly related to the memento, e.g., directly associated with at least the person who gave the memento, place where the memento was given or received, or an event where the memento was received or any combination thereof. One or more embodiments of the memento 101 may include a visual and/or machine-readable and/or human-readable code 102 to associate the data with the memento. The durable data 103 may be stored remote from the memento, for example in a server having associated computer 110. Optionally, local storage on the memento may be utilized, alone or in combination with a remote server, however if the memento is lost and the only storage is on the memento, then the memento and all indirectly related multimedia may be lost, i.e., non-durable. Remote storage, alone or in combination with local memento storage prevents obsolescence by securing data robustly and in one or more formats that may be altered at a later time, for example as technology changes and file formats change or are replaced. This enables the data to be accessed years later even if the file formats or display technology for the data has changed by that time and even if the original memento has been lost. "Other data" 104 may be associated with the memento and include financial information, or links or gifts or other items or services that are not directly associated with the memento or person, place, thing or event, but which may provide revenue, financial information or values, or information streams for example targeted at the user who gave the memento 120 or the user who received the memento 121. In one or more embodiments user 120 is the same person as user 121 and simply wishes to retain information related to the memento for later retrieval and display for example. In one or more embodiments, the code may be stored in any format on or associated with the memento and in or associated with the data on the computer or in a database associated with computer 110 for example. User 120 or 121 or both may utilize mobile device 111 and/or computer 112 to store code 102 on the memento, for example via a printable label or obtain code 102 from memento 101 for example via a scanner or camera as will be discussed in detail below.

Figure 2:
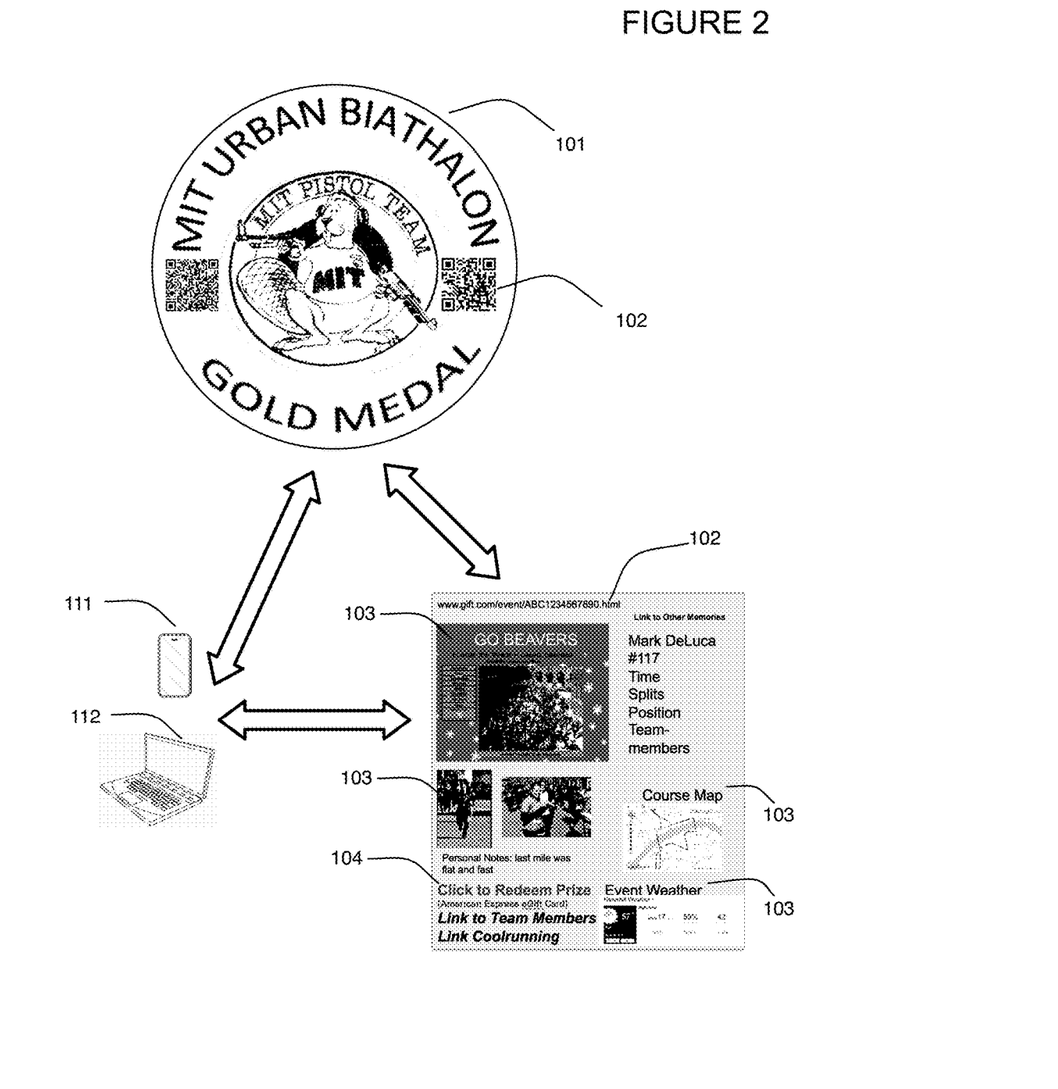
FIG. 2 illustrates exemplary components that make up an embodiment of the system.

FIG. 2 illustrates exemplary components that make up an embodiment of the system. For example, embodiments of the durable memento system include memento 101 that includes a physical object, generally having utility, such as medal, for example received as an award, which provides information as to the successful completion of an event, for example an Urban Biathalon event, in addition to providing code 102 associated with the memento. Embodiments of the invention are not limited to one code and may include multiple codes (see left side of medal for code having redundant data as code 102 or an additional code associated with addition data. As shown, code 102 associated with the memento in this case is a two-dimensional bar code or QR® code. This may be scanned by a camera and application on the mobile device 111 or computer 112 shown in FIG. 1. In addition, embodiments of the invention include data storage that is configured to store and retrieve the code and also configured to store and retrieve data associated with the memento. As shown, the data is displayed in the form of a webpage that includes a description of the event, a picture and/or movie of the event, which may include audio for example, a map of the event, a weather information area as data 103 along with a text version of the code at 102. Other data 104 may include hyperlinks or advertisements that are not directly associated with the event. The data storage is coupled to a computer, for example server 110, or alternatively or in combination in memory in a device remote to memento 101, such as mobile device 111 or computer 112. In addition, embodiments may communicate the code and data over any type of communications network as one skilled in the art will recognize and as shown as logical communications channel arrows in FIGS. 1 and 2. One such communications channel may include wireless or wired communications links, which may for example access or otherwise couple with the Internet to enable remote access from any location.

Embodiments of the system may include any type of memento, for example a keepsake, souvenir, gift, gift card, medal or award, tool or any combination thereof, and the example shown in FIG. 2 is for demonstration purposes only and not intended to be a limiting implementation. Examples further include but are not limited to items such as a special event coin, challenge coin, employee award, marketing giveaway, tournament award, golf divot tool and pet tags. Any memento that includes an association with data, whether stored local to the memento in internal memory or is utilized to access the data remotely, and wherein the data includes information related to the person who gave the memento, place where the memento was given, thing or things associated with the memento, such as the weather, maps, or other metadata associated with the memento including but not limited to hyperlinks, or event at which the memento was given is in keeping with the spirit of the invention.

Figure 3:
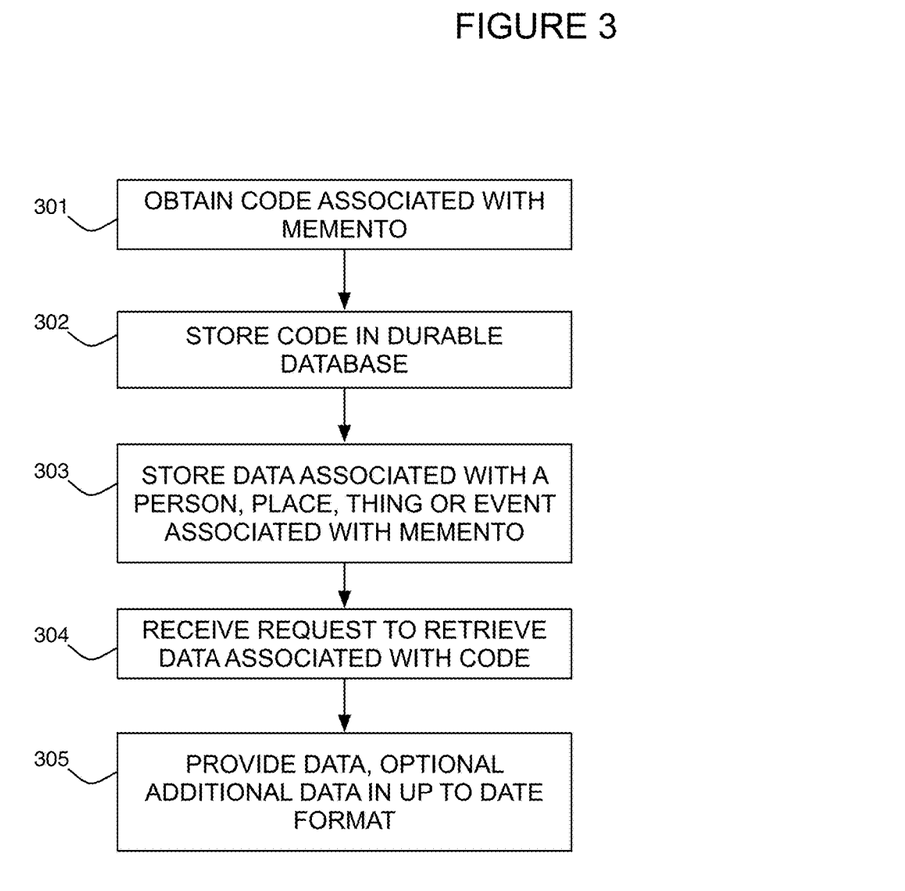
FIG. 3 illustrates an embodiment of the processing that is utilized by the system to implement the durable memento system.

FIG. 3 illustrates an embodiment of the processing that is utilized by the system to implement the durable memento system. In one or more embodiments, the code is a visual code that is human-readable or machine-readable. Alternatively or in combination, the code may include a non-visual code that is audible or machine-readable. An example of a visual code that is human-readable is an alphanumeric code. One or more embodiments may utilize a code that is a machine-readable bar code that includes a series of parallel lines that travel in one direction, or a machine-readable two-dimensional bar code. Robust and long lasting embodiments may utilize a code that is engraved onto the memento. Other embodiments of the code include a machine-readable radio frequency identification code. Regardless of the type of code utilized or encoding thereon, embodiments of the system obtain the code associated with the memento at 301. The code is then stored in the data store at 302 and is for example associated with a person, place, thing or event, which may previously have been accepted by the system, at the time of the event or at code creation time for example.

One or more embodiments of the data include pictures, movies, sounds, text or performance data associated with the memento. These types of data are not intended to be limiting and may include data in any known format. Regardless of the format or data, it is stored at 303 for future retrieval. Embodiments of the invention may utilize a webpage as shown in FIG. 2 to accept information as is known in the art. Any method of accepting data files is in keeping with the spirit of the invention, including providing a file selection user interface element and an upload button. At a later time, user 120 or 121 or any other authorized user for example may request the data wherein the system receives the request for the data at 304. If the data is stored in one format that becomes obsolete, the system is configured to translate the format into a more current format at 305. Thus, data in out of date file formats, such as older movie file formats, or even on out of date physical formats, such as floppy disks, that are virtually unreadable at this time, may still be accessed using one or more embodiments of the system. For example, at least one embodiment of the system is configured to convert the data from a stored format to a retrieved format via the computer and transmitted over the communications network on retrieval.

In one or more embodiments, the other data may further include advertisements, hyperlinks to gifts or prizes or any combination thereof. This enables the memento to be augmented not only with event or other multimedia data associated with the memento, but also with additional information that may provide a source of revenue for businesses.

Embodiments of the system may obtain the code in a variety of ways. For example, the code may be obtained via the computer after the computer presents an interface having a code entry user interface element, for example on the display of mobile device 111 or computer 112 shown in FIG. 1. The code may also be obtained by the computer from mobile device, which may also be implement as mobile computer 111 after the mobile computer obtains the code visually from the memento through use of a camera coupled with the mobile computer and the computer obtains the code from the mobile computer. Alternatively, or in combination, the code may be obtained by the computer from a mobile computer after the mobile computer obtains the code electronically from the memento through use of a scanner coupled with the mobile computer. All methods of obtaining the code are shown as a thick arrow between the mobile device/computer 111 and computer 112 and the memento 101 in FIG. 2 for example.

When the data is retrieved at any time after being stored, regardless of the format that the data was stored in, the computer, for example mobile device 111, computer 112 and/or computer 110 displays the data that includes pictures, movies, sounds, text, or performance data associated with the memento, or hyperlinks thereto, for example on a webpage or in any other manner.

Figure 4:
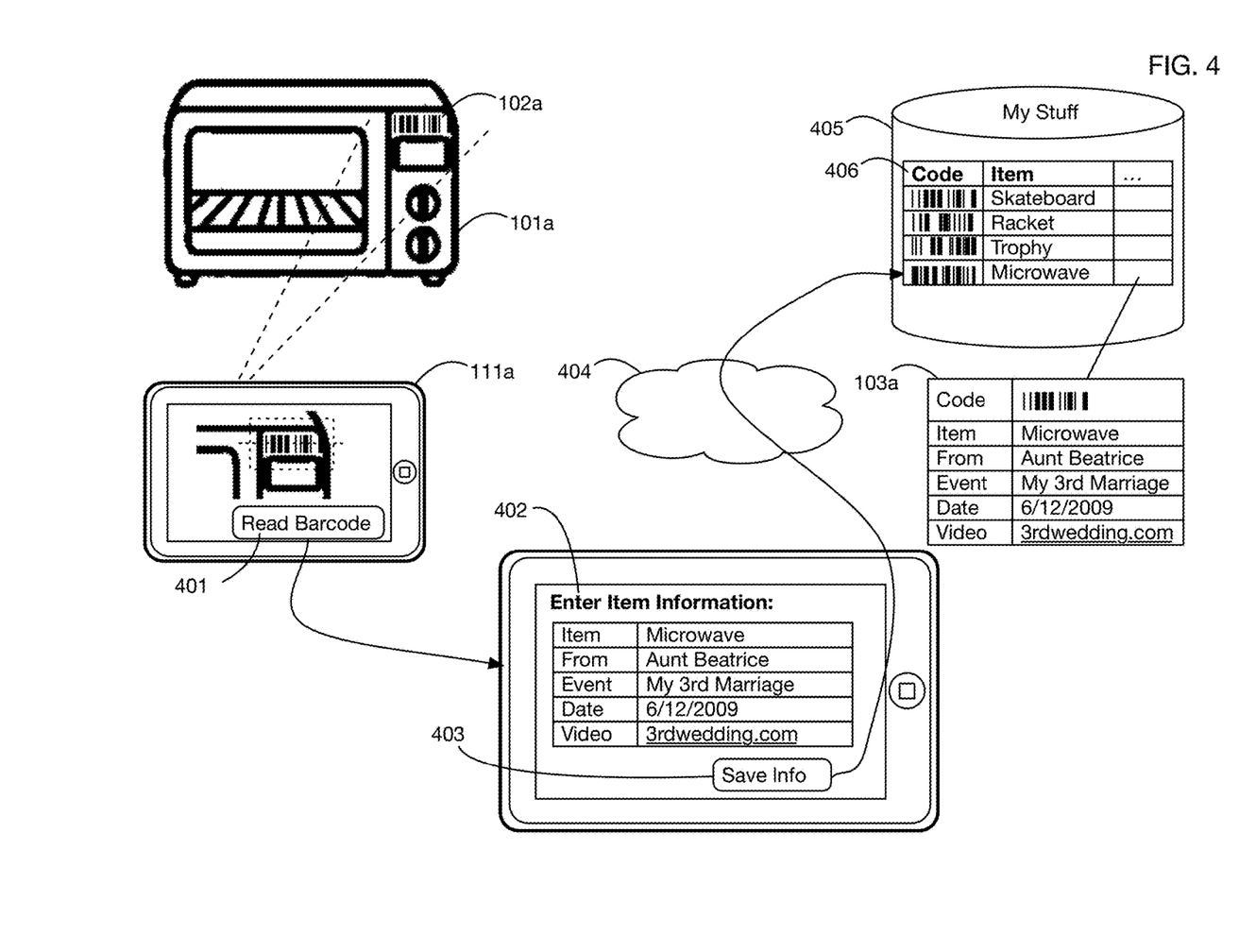
FIG. 4 illustrates an embodiment of a method that obtains a code from a memento, where the code is a barcode, and stores information about the memento in a data store indexed by the code.

One or more embodiments of the invention enables a method for obtaining a code from a memento in any desired manner and for any type of code. The method may include obtaining the code, storing the code along with information about the memento, and retrieving information about the memento using the code. FIG. 4 illustrates obtaining a code and storing information for memento 101a. In this illustrative example, the code associated with memento 101a is barcode 102a, which is attached to or engraved into the memento itself. A barcode is an illustrative type of code; one or more embodiments may use any type or types of codes to identify a memento, including features of or appearance of the memento itself. In the example of FIG. 4, a user uses mobile device 111a to read the barcode 102a of memento 101a, using an application that may include or access a barcode reader or the mobile device's camera. The user locates the barcode and then presses button 401 to initiate capture of the memento information. This action causes the application to display data entry screen 402 for entry of information. When the user presses the save button 403, the code along with the data is transmitted over a network 404 (such as for example the Internet) to a data store 405. This data store may be indexed by the code, for example using a table or tables with key column 406. The details 103a of the memento 102a are stored in this data store, and can be retrieved (or updated) using the code.

Figure 5:
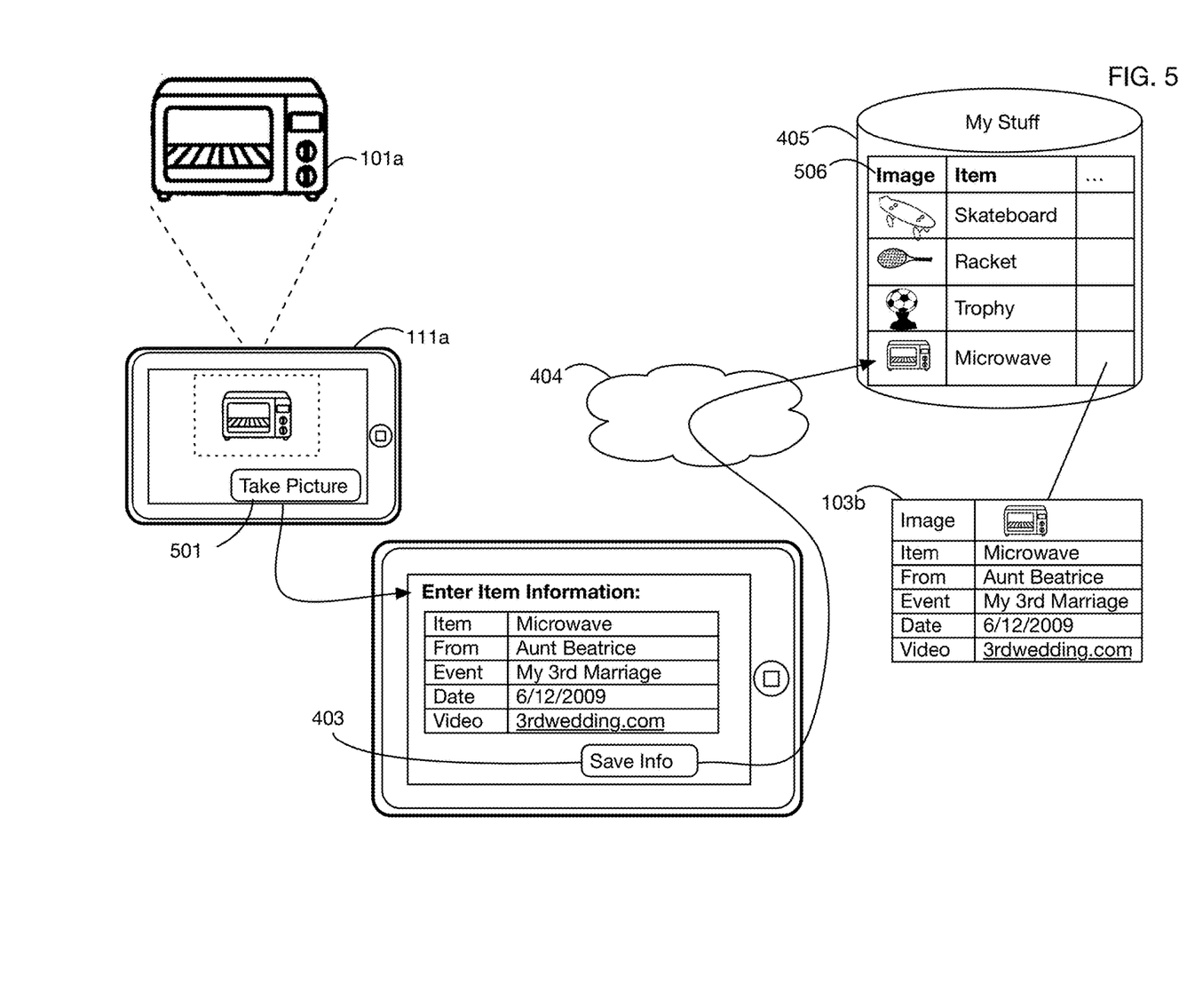
FIG. 5 illustrates a variation of the method of FIG. 4, where the code for a memento is an image of the memento; the image may for example be captured using a camera of a mobile device.

FIG. 5 illustrates a variation of the method shown in FIG. 4, where the code for the memento is an image of the memento itself, or is a unique code based thereon, rather than a separate barcode or other identifier affixed to the memento. The process illustrated in FIG. 5 is analogous to that shown in FIG. 4. The user uses mobile device 111a to capture a picture of the memento 101a; this image, or some portion or transformation thereof, may serve as the code for the memento. After the user presses the take picture button 501, the application displays a data entry screen as described with respect to FIG. 4. In one or more embodiments, the image captured by the user may be processed in any desired manner to form the code for the memento; for example, the image may be compressed, transformed, or normalized to form a memento code. As in FIG. 4, when the user presses the save button 403, the code and the memento data are transmitted to data store 405. In this example, the code that is transmitted is the image of the memento 101a, rather than a barcode as illustrated in FIG. 4. The data store 405 has tables that may be indexed by the images 506 of the mementos stored in the data store, or by any features or data related to these images. Any type or method of image recognition may be utilized in embodiments of the invention to recognize the type of object, the make or manufacturer, model or specific version or subtype of object. A unique login or code for the user may be utilized in combination with the unique code based on the image to access all of the memento information for a user, and the unique login or code for the user may be biometric for example. The ability to access a single URL to obtain all of the information related to a user's memento is a great improvement over the plethora of individual store websites that a user may never remember if the user loses his or her mementos for example.

Figure 6:
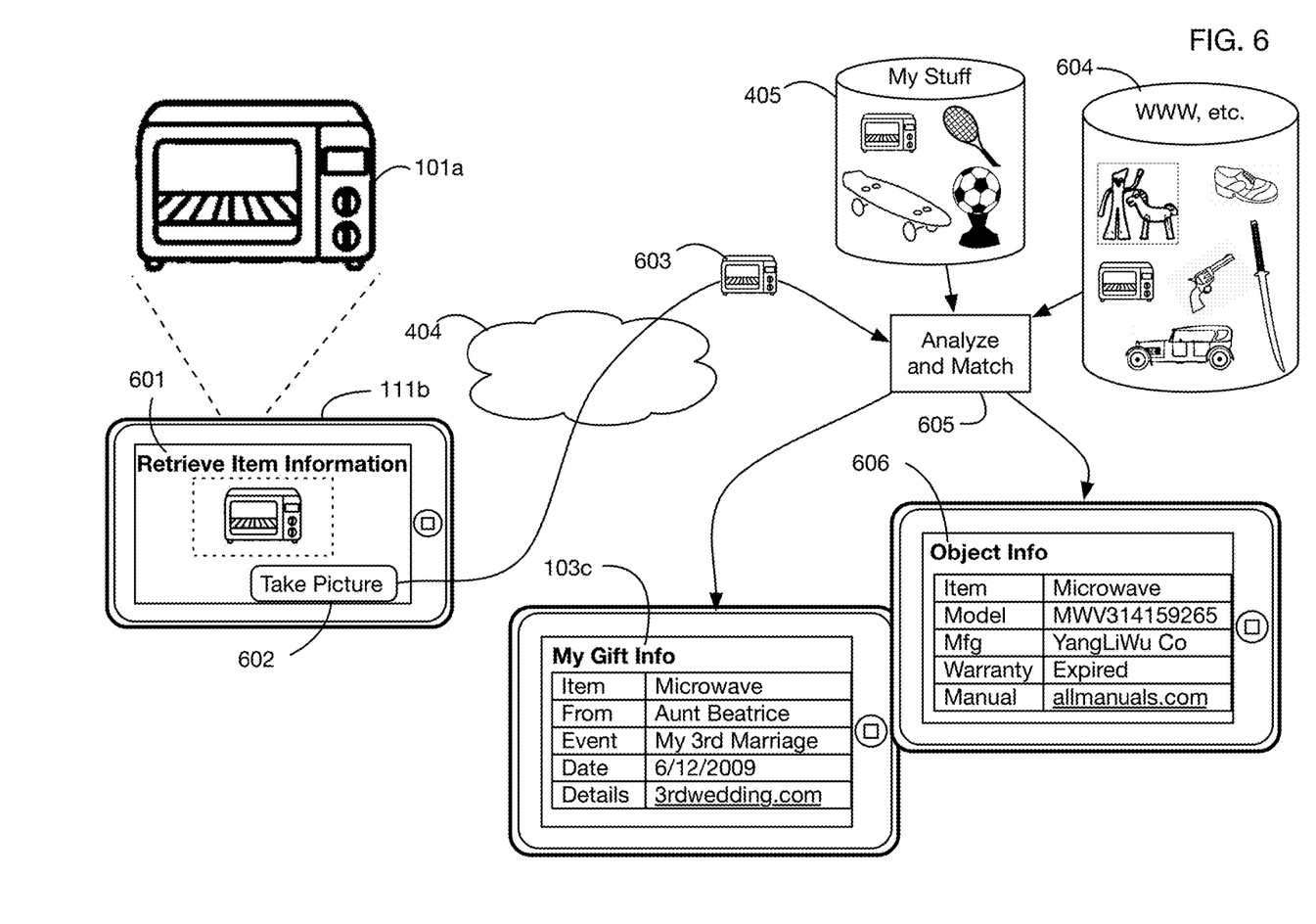
FIG. 6 illustrates retrieval of the memento information stored in FIG. 5; a user captures another image of the memento and this image is used to lookup information on the memento.

For embodiments that use memento images as codes, retrieval of memento information may also be performed using images. FIG. 6 continues the example of FIG. 5 to show data retrieval using an image. A user uses device 111b to take an image of an item 101a for which the user wants to retrieve stored information. The device 111b may or may not be the same as the device 111a that originally captured an image of the memento. Screen 601 of an application on the device prompts the user to capture an image of the item. When the user captures the image using button 602 (which may for example activate a camera associated with device 111b), the image 603 of memento 101a is captured and is transmitted over network 404 to a server that performs an analysis and matching procedure 605 to identify the memento in the image. This procedure 605 accesses the data store 405, which contains memento data indexed by the images associated with the mementos when the data was entered. The analysis and matching procedure 605 may use any image matching techniques known in the art to determine which memento in the data store 405 matches the image 603. The image or a unique code based thereon is thus created either in the server, or optionally in a local computing device. Image analysis and matching may for example take into account variations in angles, camera viewpoint, lighting, zoom, or camera quality in comparing a captured image 603 to the stored images in data store 405.

When the analysis and matching procedure 605 identifies the memento in the data store 405 corresponding to the image code 603, it retrieves data associated with the memento from the data store, for example using the image as the unique code, or via a code based on the image, and it may transmit this data to the user, for example for display on the mobile device 111b. Screen 103c for example shows the stored memento data associated with memento 101a.

In one or more embodiments, a code for a memento may also be used to retrieve additional information about the memento, including potentially information that is publically available. For example, in the embodiment illustrated in FIG. 6, the analyze and match procedure 605 may also use the image 603 of memento 101a to search databases and information sources for other information about the memento. These databases may include for example, without limitation, any data sources available on the world-wide web. Any data associated with the memento may be transmitted to the user for display. In the example of FIG. 6, screen 606 shows illustrative publically available information that may be retrieved using the memento image code 603. This information may include for example, without limitation, product information, manufacturer information, distributor information, service information, warranty information, product literature, reviews, and product manuals. One or more embodiments may combine and filter the user-generated memento information 405 and the public information 604 in any desired manner.

Figure 7:
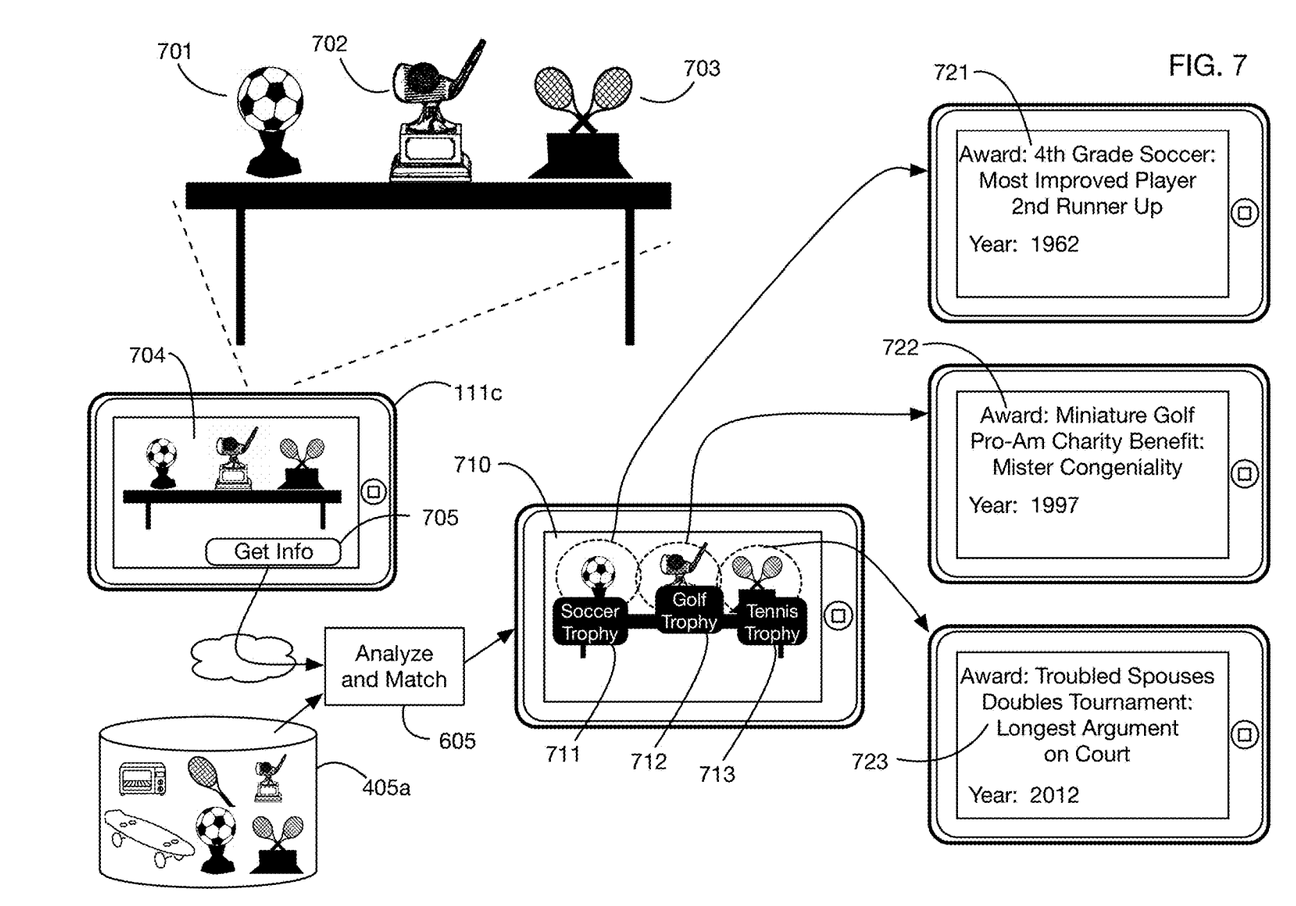
FIG. 7 illustrates an embodiment that analyzes an image of a scene to identify mementos in the scene, and that tags the mementos in the image with labels that may be linked to detailed information about each memento.

One or more embodiments that use images as memento codes may also provide capabilities to recognize and tag mementos in images of a scene. FIG. 7 illustrates an example where a user takes a picture of trophy table and wants to retrieve information about any mementos on the trophy table that have been previously described and saved in the data store. The user uses mobile device 111c to capture image 704 of a trophy table that holds mementos 701, 702, and 703. When the user captures the image and requests information via button 705, the image 704 is transmitted over the network to an analysis and matching system 605, which analyzes the image 704 to determine which mementos if any are present in the image. Alternatively, the processing may be performed locally given the high level of mobile computers and personal computers that are ubiquitous. This procedure compares the image 704 to the images stored in data store 405a. Areas of the image 704 that match memento images in data store 405a are then tagged in screen 710. This tagging may for example place a label near the image of each identified memento; the label may describe the memento or provide any desired information. In one or more embodiments, a user may be able to obtain detailed information about identified mementos, for example by tapping on the label or by otherwise indicating that more information is requested. In the example of FIG. 7, the user may select label 711 to obtain detail screen 721, select label 712 to obtain detail screen 722, and select label 723 to obtain detail screen 723. The detail screens may contain any or all of the data in the data store associated with the selected memento.

While the invention herein disclosed has been described by means of specific embodiments and applications thereof, numerous modifications and variations could be made thereto by those skilled in the art without departing from the scope of the invention set forth in the claims.

What is claimed is:

1. A durable memento method comprising:
    obtaining a code that is human-readable or machine-readable from a memento,
        wherein said code is associated with data stored remote to said memento and wherein said data is not directly associated with a value of the memento, and
        wherein said code provides a one to one mapping between said data and one memento, and wherein said data is provided by a person who gives the memento or a person who receives the memento or both;
    storing and retrieving memento related information for each of a plurality of disparate mementos from a plurality of disparate manufacturers to and from data storage remote to said memento comprising a single domain name, wherein said plurality of disparate mementos are associated with a plurality of persons, wherein said data storage comprises:
        the code that is obtained from the memento;
        memento metadata that identifies said memento;
        giver data corresponding to said person that gives the memento;
        receiver data corresponding to said person that receives the memento;
        the data associated with said code that is human-readable or machine-readable in said one to one mapping between said code and said one memento, wherein said data includes at least pictures, movies or sound or any combination thereof that is indirectly associated with the memento via said code, and
        directly associated with
            said person who gives the memento, or
            a place where the memento was given, or
            an event where the memento was received, or any combination thereof,
        and;
        wherein the data storage is coupled to
            a computer and
            a communications network; and,
    providing said single domain name to said computer in human-readable form to said plurality of persons at least who receive said each of said plurality of said disparate mementos from said plurality of disparate manufacturers;
    accepting by said computer,
        said data comprising at least said pictures, said movies or said sound or any combination thereof,
        said memento metadata and
        said giver data for said each of said plurality of disparate mementos from said plurality of disparate manufacturers associated with said receiver data;
    retrieving said data by said computer, comprising at least said pictures, said movies or said sound or any combination thereof, said memento metadata and said giver data for said each of said plurality of disparate mementos from said plurality of disparate manufacturers associated with said receiver data; and,
    providing said data comprising at least said pictures, said movies or said sound or any combination thereof, said memento metadata and said giver data associated with said receiver data to an authorized user comprising said person who receives said plurality of said disparate mementos from said plurality of disparate manufacturers wherein when the data is in an obsolete format, translating the obsolete format into an up-to-date current format in order to enable access to said data.

2. The durable memento method of claim 1, wherein said code is engraved or attached to said memento.

3. The durable memento method of claim 1, wherein said code comprises an image of said memento.

4. The durable memento method of claim 3, further comprising capturing a first image of said memento;
    storing said first image of said memento as said code in said data storage;
    wherein said retrieving said data by said computer comprises
        capturing a second image of said memento;
        matching said second image to said first image in said data storage to identify said memento in said data storage.

5. The durable memento method of claim 4, further comprising
    analyzing an image of a scene to identify one or more mementos in said scene;
    annotating said image of said scene with an indicator identifying each of said one or more mementos in said scene.

6. The durable memento method of claim 5, further comprising
    retrieving said data associated with a memento when a user selects said indicator identifying said memento.

7. The durable memento method of claim 1, further comprising converting the data from a stored format to a retrieved format via the computer and transmitting the data over the communications network on retrieval.

8. The durable memento method of claim 1, further comprising obtaining the code by the computer after presenting an interface having a code entry user interface element.

9. The durable memento method of claim 1, further comprising obtaining the code by the computer from a mobile computer after presenting an interface by the mobile computer having a code entry user interface element.

10. The durable memento method of claim 1, further comprising obtaining the code by the computer from a mobile computer after obtaining the code visually by the mobile computer from the memento through use of a camera coupled with the mobile computer.

11. The durable memento method of claim 1, further comprising obtaining the code by the computer from a mobile computer after obtaining the code by the mobile computer electronically from the memento through use of a scanner coupled with the mobile computer.

12. The durable memento method of claim 1, further comprising displaying by the computer, the data that comprises pictures, movies, sounds, text, or performance data associated with the memento via said single domain name.

13. The durable memento method of claim 1, wherein the code is a machine-readable radio frequency identification code.

14. The durable memento method of claim 1, further comprising:
- engraving or attaching a second code that is human-readable or machine-readable to the memento, wherein said second code is engraved or attached to said memento by the person who gives the memento or the person that receives the memento,
- wherein said second code is associated with second data stored remote to said memento and wherein said second data is not directly associated with a value of the memento, and
- wherein said second code provides a one to one mapping between said second data and the one memento, and wherein said second data is provided by said person who gives the memento or said person who receives the memento or both.

15. The durable memento method of claim 1, wherein said data directly associated with a place where the memento was given, or an event where the memento was received, or any combination thereof comprises one or more of a map of said event where the memento was received, weather information of said place where the memento was given, information associated with a completion of said event or any combination thereof.

* * * * *